United States Patent
Schick et al.

(10) Patent No.: US 9,453,528 B2
(45) Date of Patent: Sep. 27, 2016

(54) BEARING ASSEMBLY FOR A CONNECTING ROD

(75) Inventors: Gary Schick, Easley, SC (US); Scott Brown, Simpsonville, SC (US)

(73) Assignee: Koyo Bearings North America LLC, Westlake, OH (US)

( * ) Notice: Subject to any disclaimer, the term of this patent is extended or adjusted under 35 U.S.C. 154(b) by 0 days.

(21) Appl. No.: 14/377,541

(22) PCT Filed: Feb. 8, 2012

(86) PCT No.: PCT/US2012/024236
§ 371 (c)(1),
(2), (4) Date: Dec. 3, 2014

(87) PCT Pub. No.: WO2013/119217
PCT Pub. Date: Aug. 15, 2013

(65) Prior Publication Data
US 2015/0078692 A1    Mar. 19, 2015

(51) Int. Cl.
| | |
|---|---|
| *F16C 9/02* | (2006.01) |
| *F16C 9/04* | (2006.01) |
| *F16C 19/28* | (2006.01) |
| *F16C 33/60* | (2006.01) |
| *F16C 33/58* | (2006.01) |
| *F16C 19/38* | (2006.01) |

(52) U.S. Cl.
CPC . *F16C 9/04* (2013.01); *F16C 9/02* (2013.01); *F16C 19/28* (2013.01); *F16C 19/38* (2013.01); *F16C 33/581* (2013.01); *F16C 33/605* (2013.01)

(58) Field of Classification Search
CPC ............ F16C 9/02; F16C 9/04; F16C 19/28; F16C 19/38; F16C 33/605
USPC .................................................. 384/457, 564
See application file for complete search history.

(56) References Cited

U.S. PATENT DOCUMENTS 1,249,784 A * 12/1917 Mecaniques .................. 384/560
1,582,935 A *  5/1926 Schneider ..................... 384/457
(Continued)

FOREIGN PATENT DOCUMENTS

| | | | |
|---|---|---|---|
| FR | 720083 A | 2/1932 | |
| GB | 218633 A * | 9/1925 | ............... F16C 9/04 |

(Continued)

OTHER PUBLICATIONS

International Search Report and the Written Opinion for PCT/US2012/024236 dated Nov. 5, 2012.

(Continued)

*Primary Examiner* — Phillip A Johnson
(74) *Attorney, Agent, or Firm* — Nelson Mullins Riley & Scarborough, LLP (57) ABSTRACT

A bearing assembly including a connecting rod (30) with a first end (32) and a second end (36), the second end (36) defining a first outer raceway (44a) and a second outer raceway (44b) with a thrust ring (60) therebetween, a crankshaft (10) defining a cylindrical inner raceway (14), a first plurality of radial roller elements (52a) disposed between the first outer raceway (44a) and the inner raceway (14), and a second plurality of radial roller elements (52b) disposed between the second outer raceway (44b) and the inner raceway (14). An axial length of at least one of the first radial roller elements (52a) is greater than an axial length of the first outer raceway (44a) and the axial length of at least one of the second radial roller elements (52b) is greater than an axial length of the second outer raceway (44b).

16 Claims, 7 Drawing Sheets

(56) References Cited

U.S. PATENT DOCUMENTS 1,790,253 A 1/1931 Taylor
3,086,827 A 4/1963 White

FOREIGN PATENT DOCUMENTS

GB 258128 A 9/1926
JP 2002174230 A 6/2002
WO WO 9967543 A1 * 12/1999

OTHER PUBLICATIONS

Office Action dated Aug. 25, 2015 for Japanese Patent Application No. 2014-556522.
Office Action dated Sep. 4, 2015 for Korean Patent Application No. 10-2014-7024356.
First Office Action dated Dec. 22, 2015, for Chinese Patent Application No. 201280071452.8.

* cited by examiner

BEARING ASSEMBLY FOR A CONNECTING ROD

FIELD OF THE INVENTION

The present invention relates to bearings for use between a connecting rod and a corresponding crankshaft. More specifically, the invention relates to a bearing capable of supporting both radial and axial loads.

BACKGROUND OF THE INVENTION

In reciprocating engines, a piston reciprocates within a cylinder. The piston is connected to a crankshaft by a connecting rod such that movement of the piston drives the crankshaft. A bearing is provided between the connecting rod and the crankshaft to absorb radial forces generated by the relative movement between the connecting rod and the crankshaft. The axial ends of the bearing contact a surface of the crankshaft. Often, the axial ends of the bearing are flanges that extend radially outwardly from opposing ends of the bearing's cage such that they are disposed between opposing surfaces of the connecting rod and crankshaft. The contact between the connecting rod faces and the crankshaft can cause the interface surface to wear poorly. Also, the friction generated between the connecting rod and the bearing and between the crankshaft and the connecting rod generates heat that can cause damage to the bearing or the components themselves.

The prior art includes various attempts designed to decrease the amount of friction generated between the connecting rod and the crankshaft, for example, lubrication of the connecting rod and crankshaft interface, such as by spray lubrication. However, the gaps that exist between the connecting rod and portion of the crankshaft to which it is connected are typically reduced due to the radial flanges of the bearing's cage which extend outwardly into those gaps. Moreover, tight tolerances can hinder the ability to provide lubrication to the crankshaft's raceway on which the roller elements of the bearing ride.

The present invention recognizes and addresses considerations of prior art constructions and methods.

SUMMARY OF THE INVENTION

One embodiment of a baring assembly in accordance with the present disclosure includes a connecting rod with a first end and a second end, the first end defining a cylindrical aperture with a thrust ring depending radially inwardly therefrom such that the cylindrical aperture defines a first outer raceway and a second outer raceway on opposite sides of the thrust ring, a crankshaft defining a cylindrical inner raceway disposed between a pair of opposed inner walls, a first plurality of radial roller elements disposed between the first outer raceway and the inner raceway, each of the first radial roller elements having a first end face, an opposed second end face and defining an axial length therebetween, and a second plurality of radial roller elements disposed between the second outer raceway and the inner raceway, each of the second radial roller elements having a first end face, an opposed second end face and defining an axial length therebetween. The axial length of at least one of the first plurality of radial roller elements is greater than an axial length of the first outer raceway and the axial length of at least one of the second plurality of radial roller elements is greater than an axial length of the second outer raceway.

Another embodiment of a bearing assembly for use between a connecting rod defining an outer raceway and a crankshaft defining an inner raceway includes a first plurality of radial roller elements disposed between the outer raceway and the inner raceway, each of the first radial roller elements having a first end face, an opposed second end face and defining an axial length therebetween, a second plurality of radial roller elements disposed between the outer raceway and the inner raceway, each of the second radial roller elements having a first end face, an opposed second end face and defining an axial length therebetween, and a thrust ring disposed between the first plurality of radial roller elements and the second plurality of radial roller elements. A maximum axial length of the outer raceway of the connecting rod is less than an overall axial length defined by the axial length of the at least one of the first plurality of radial roller elements, the axial length of the at least one of the second plurality of radial roller elements and an axial length of the thrust ring.

Other aspects of the invention will become apparent by consideration of the detailed description and accompanying drawings.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention according to the disclosure.

DETAILED DESCRIPTION

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the figures, an embodiment of a bearing assembly 50 in accordance with the present disclosure is shown in FIGS. 1 through 5. In reciprocating engines (not shown) a piston reciprocates within a cylinder and drives a crankshaft 10. The piston is connected to crankshaft 10 by a connecting rod 30 such that crankshaft 10 is driven by movement of the piston, with bearing assembly 50 being received between crankshaft 10 and connecting rod 30 to reduce friction. The movement of the piston, crankshaft 10, and connecting rod 30 causes axial and radial forces to be exerted between connecting rod 30 and crankshaft 10 through bearing assembly 50.

Figure 1:
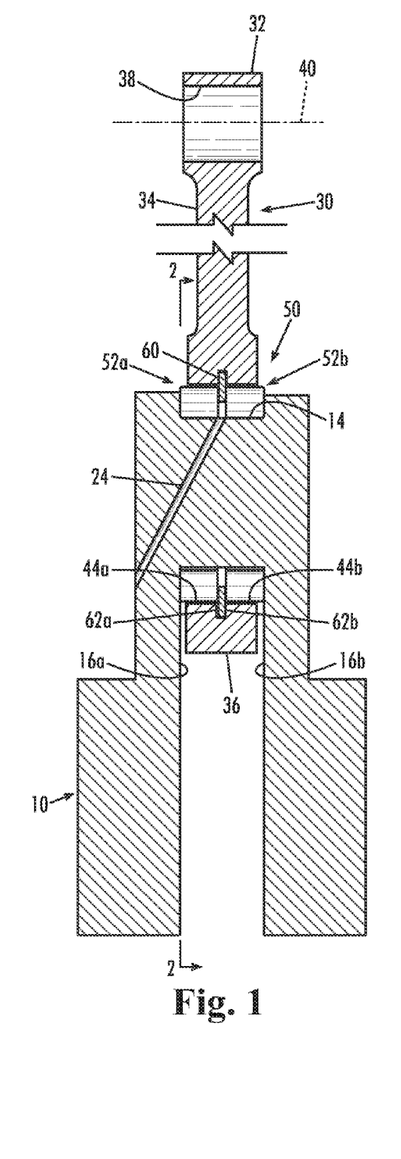
FIG. 1 is a cross-sectional view of an embodiment of a bearing assembly for use between a connecting rod and crankshaft, taken along line 1-1 of FIG. 2.
Figure 2:
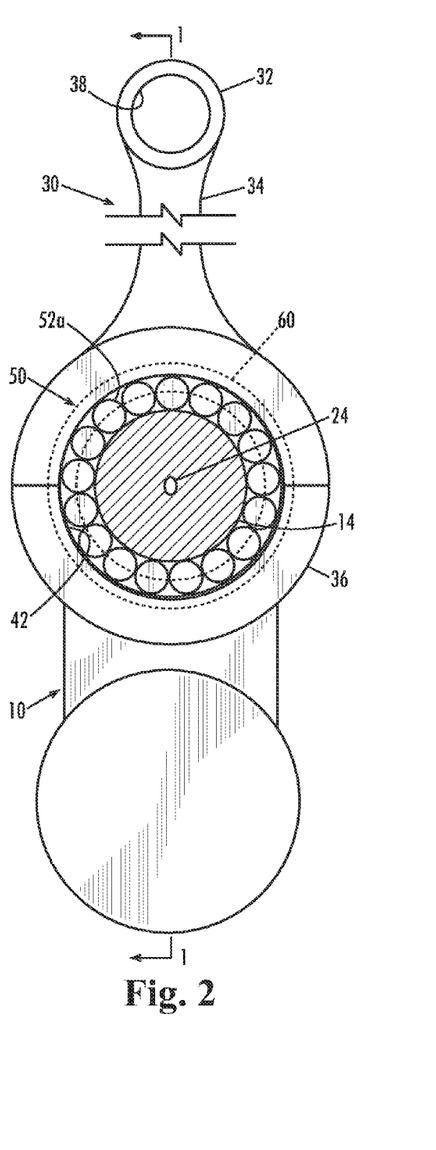
FIG. 2 is a cross-sectional view of the bearing assembly, taken along line 2-2 of FIG. 1.
Figure 3:
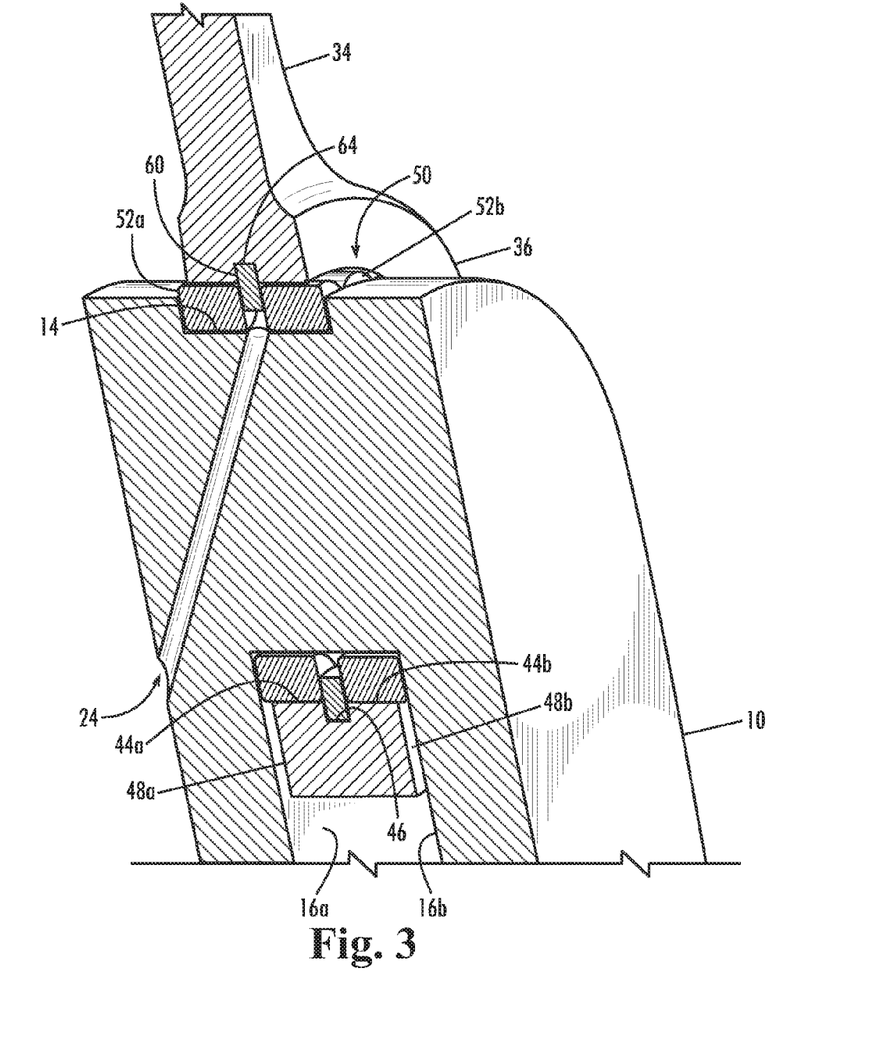
FIG. 3 is a partial cross-sectional view of the bearing assembly as shown in FIG. 1.

As best seen in FIGS. 1 and 2, connecting rod 30 includes a first end 32, a rod portion 34, and a second end 36. First end 32 defines a first aperture 38 and is connected to the piston by a piston pin that passes through first aperture 38. A pivot axis 40 is defined through the center of first aperture 38 and first end 32 and connecting rod 30 pivot about the piston pin as the piston reciprocates in the cylinder. Second end 36 of connecting rod 30 defines a second aperture 42. A portion of crankshaft 10 is rotatably received through second aperture 42 such that crankshaft 10 is coupled to connecting rod 30. Bearing assembly 50 is positioned between second aperture 42 of connecting rod 30 and the portion of the crankshaft 10 which passes therethrough to absorb radial and axial forces generated therebetween.

Figure 4:
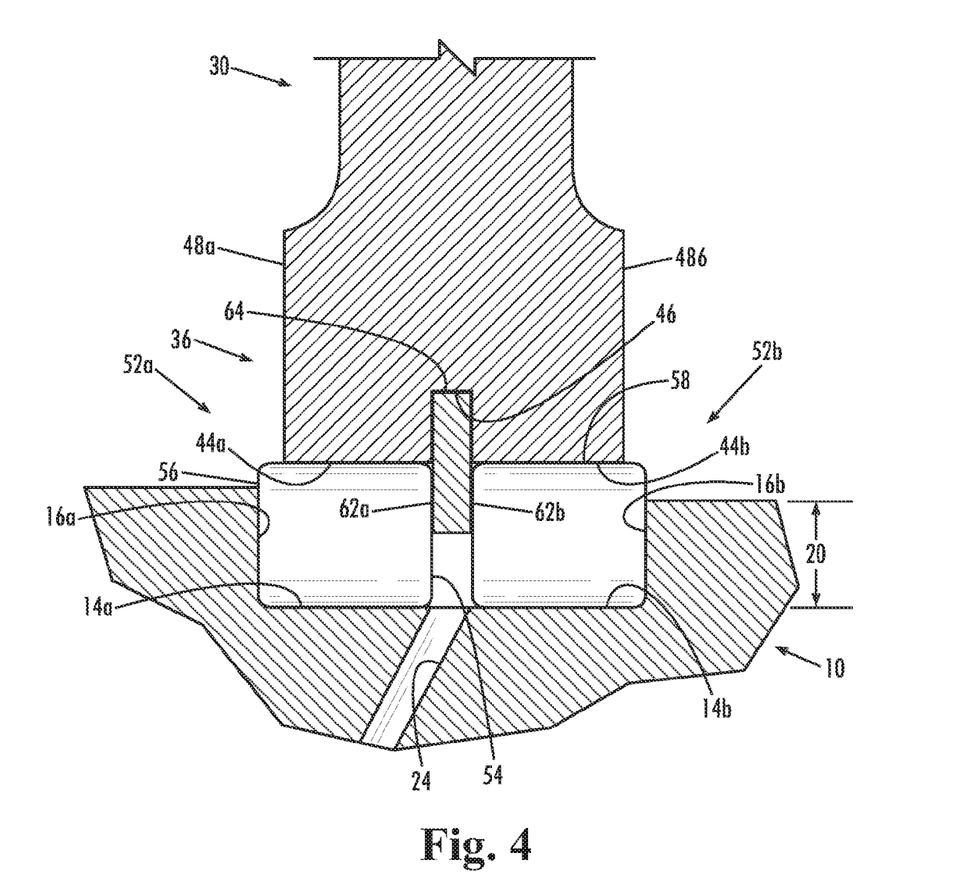
FIG. 4 is a partial cross-sectional view of the bearing assembly as shown in FIG. 1.

As best seen in FIG. 4, bearing assembly 50 includes a first plurality of roller elements 52a, a second plurality of roller elements 52b, and a thrust ring 60 disposed therebetween. As shown, the inner circumferential surface of connecting rod's 30 second aperture 42 defines an outer raceway 44 and an annular groove 46 extending radially outwardly from outer raceway 44 into second end 36 of connecting rod 30. Annular groove 46 is configured to receive thrust ring 60 of bearing assembly 50 and divides outer raceway 44 into a first outer raceway 44a and a second outer raceway 44b. Additionally, a portion of crankshaft 10 received in second aperture 42 of connecting rod 30 defines a cylindrical inner raceway 14 between opposed inner walls 16a and 16b of crankshaft 10.

Figure 5:
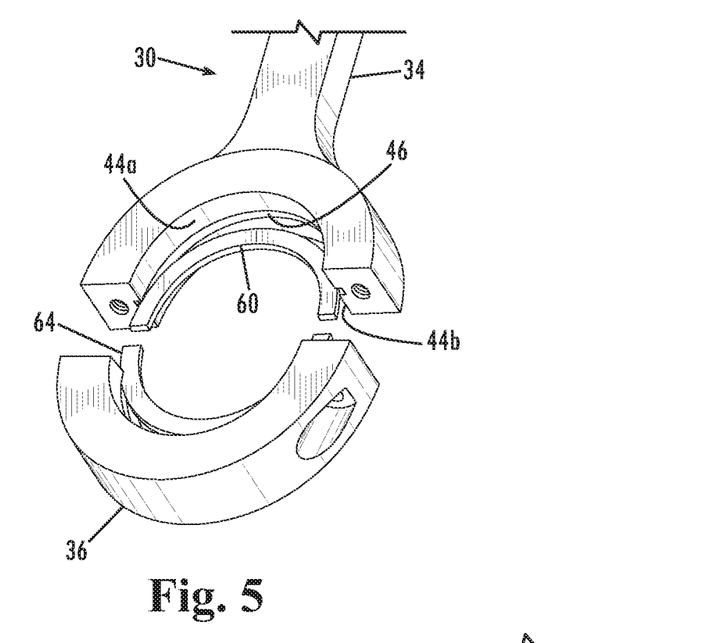
FIG. 5 is a partial perspective view of an alternate embodiment of a bearing assembly in accordance with the present disclosure.

In the embodiment shown, bearing assembly 50 is used with a solid crankshaft 10. However, bearing assembly 50 may also be used with assembled crankshaft 10a, such as that shown in FIG. 10. As shown in FIG. 5, both thrust ring 60 and second end 36 of connecting rod 30 are formed of at least two separate parts such that they can be positioned about the portion of crankshaft 10 that is received in second aperture 42. Thrust ring 60 includes an outer circumferential surface 64 that is received in annular groove 46 of connecting rod 30 and includes a pair of parallel sides that define opposed bearing surfaces 62a and 62b. As best seen in FIG. 4, the first and second pluralities of roller elements 52a and 52b, respectively, are received in the annular space defined between inner raceway 14 and outer raceway 44. More specifically, roller elements 52a of the first plurality are disposed between first inner raceway 14a and first outer raceway 44a, and roller elements 52b of the second plurality are disposed between second inner raceway 14b and second outer raceway 44b, the two pluralities of rolling elements 52a and 52b being disposed on opposite sides of thrust ring 60.

Each roller element 52a of the first plurality includes a first end face 54 disposed adjacent bearing surface 62a of thrust ring 60, a second end face 56 disposed adjacent inner wall 16a of crankshaft 10, and a cylindrical outer surface 58 that is in contact with first inner raceway 14a and first outer raceway 44a. Similarly, each roller element 52b of the second plurality includes a first end face 54 disposed adjacent bearing surface 62b of thrust ring 60, a second end face 56 disposed adjacent inner wall 16b of crankshaft 10, and an outer circumferential surface 64 in contact with second inner raceway 14b and second outer raceway 44b. Preferably, as shown in FIG. 4, the axial length of each roller element 52a of the first plurality is greater than the axial length of first outer raceway 44a. As such, abutment of bearing surface 62a of thrust rings 60 with first end faces 54 of first roller elements 52a prevents first outer face 48a of connecting rod 30 from making contact with inner wall 16a of crankshaft 10. Similarly, the axial length of each roller element 52b of the second plurality is greater than the axial length of second outer raceway 44b. As such, the abutment of bearing surface 62b of thrust ring 60 with first end faces 54 of second roller elements 52b prevents outer face 48b of connecting rod 30 from making contact with inner wall 16b of crankshaft 10. Preferably, both first and second pluralities of roller elements 52a and 52b comprise a full complement of roller elements.

As best seen in FIG. 4, the height of opposed inner walls 16a and 16b at the outermost portion of crankshaft 10 are less than the diameters of first and second roller elements 52a and 52b, respectively, creating gaps between second end 36 of connecting rod 30 and crankshaft 10. As such, a spray system may be used to provide lubricating fluids to bearing assembly 50. Preferably, crankshaft 10 is drilled to provide a lubrication pathway 24 that is in communication with inner raceway 14. Lubrication pathway 24 preferably terminates on a portion of inner raceway 14 that is disposed between first inner raceway 14a and second inner raceway 14b. As such, lubrication pathway 24 provides lubricating fluids to an area that is between first and second pluralities of roller elements 52a and 52b.

Figure 6:
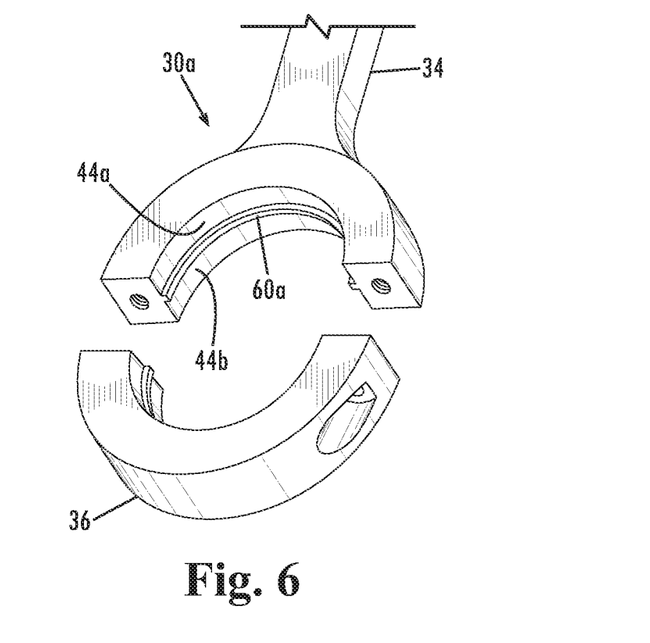
FIG. 6 is a partial perspective view of an alternate embodiment of a bearing assembly in accordance with the present disclosure.

As shown in FIG. 6, an alternate embodiment of a bearing assembly in accordance with the present disclosure includes a connecting rod 30a in which a thrust ring 60a is integrally formed with its second end 36. The bearing assembly including the integrally formed thrust ring 60a functions similarly to the embodiment of bearing assembly 50, as discussed with regard to FIGS. 1 through 5.

Figure 7:
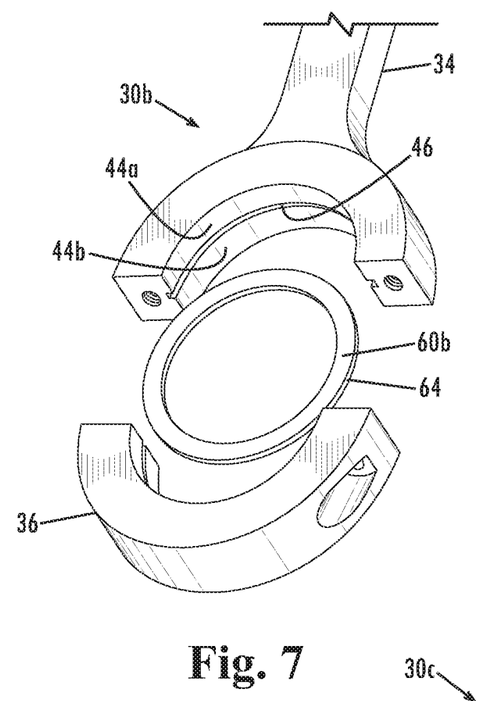
FIG. 7 is a partial perspective view of an alternate embodiment of a bearing assembly in accordance with the present disclosure.

As shown in FIG. 7, an alternate embodiment of a bearing assembly in accordance with the present disclosure includes a unitarily formed thrust ring 60b that is received in annular groove 46 defined by second end 36 of connecting rod 30b. The bearing assembly including a unitarily formed thrust ring 60b differs only from the embodiment discussed with regard to FIGS. 1 through 5 in that it can only be used with an assembled crankshaft 10a, such as that shown in FIG. 10.

Figure 8:
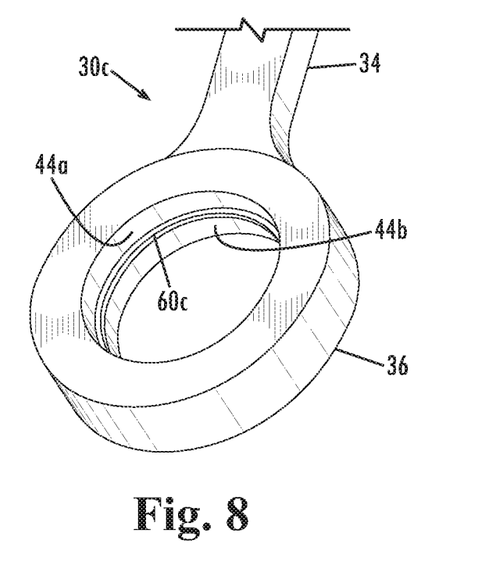
FIG. 8 is a partial perspective view of an alternate embodiment of a bearing assembly in accordance with the present disclosure.
Figure 9:
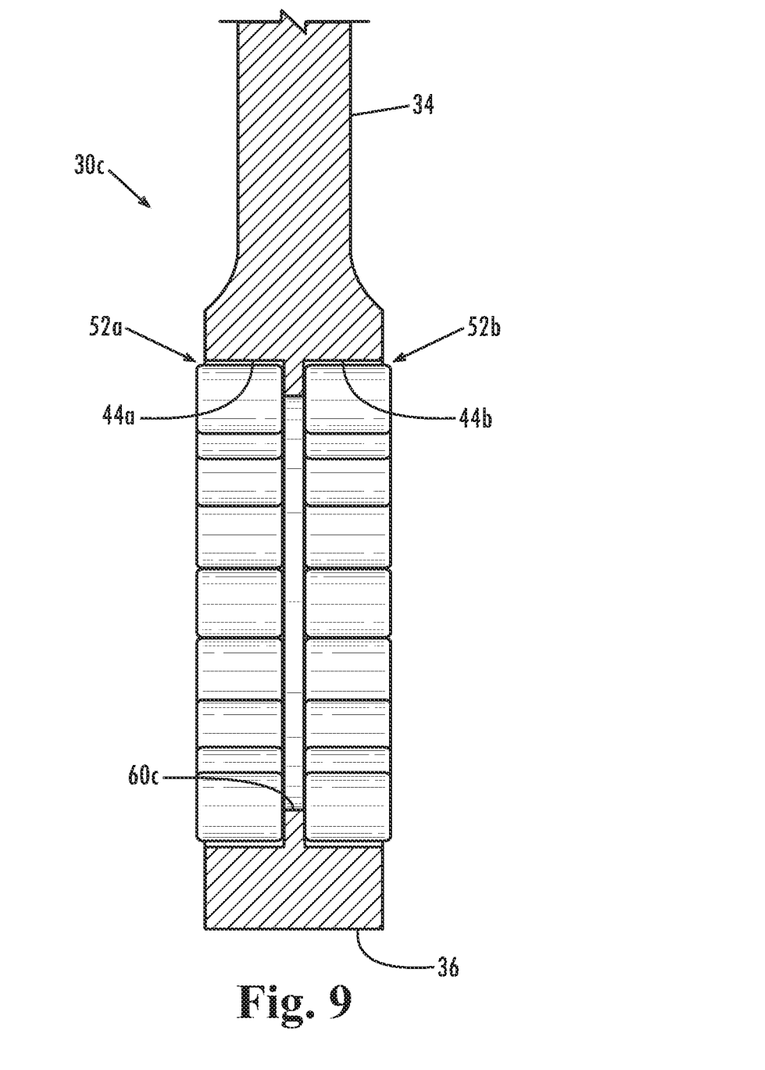
FIG. 9 is a partial cross-sectional view of the bearing assembly as shown in FIG. 8.
Figure 10:
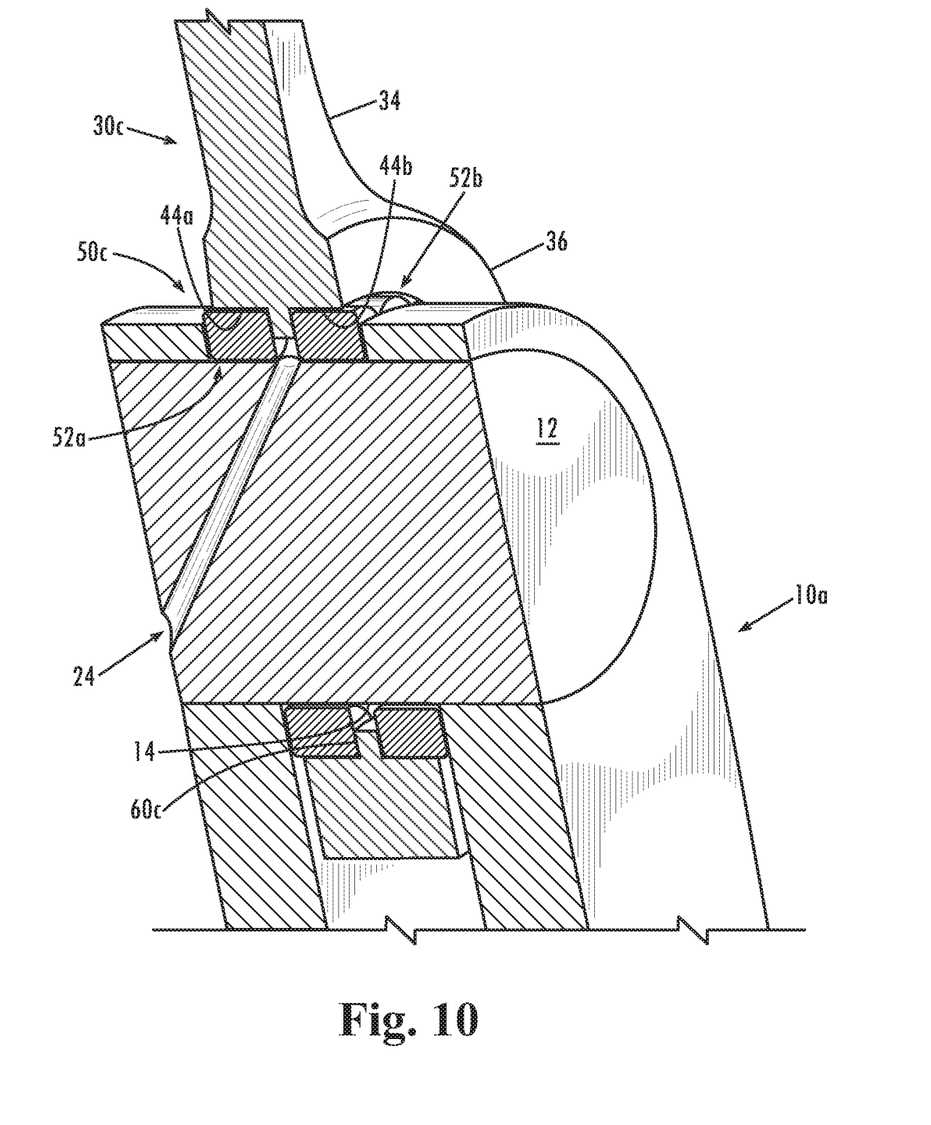
FIG. 10 is a partial, perspective cross-sectional view of the bearing assembly as shown in FIG. 8.

Referring now to FIGS. 8 through 10, an alternate embodiment of a bearing assembly in accordance with the present disclosure is shown. Bearing assembly 50c differs primarily from the embodiment discussed with regard to FIGS. 1 through 5 in that a second end 36 of connecting rod 30c is a continuous ring that includes an integrally formed thrust ring 60c. As such, bearing assembly 50c is used with an assembled crankshaft 10a, with second end 36 of connecting rod 30c secured to crankshaft 10a by a crank pin 12 which passes therethrough.

While one or more preferred embodiments of the invention are described above, it should be appreciated by those skilled in the art that various modifications and variations can be made in the present invention without departing from the scope and spirit thereof. For example, the lengths of each roller element within the first and second pluralities of roller elements do not have to be the same. It is intended that the present invention cover such modifications and variations as come within the scope and spirit of the appended claims and their equivalents.

What is claimed is:

1. A bearing assembly comprising:
a connecting rod with a first end and a second end, the first end defining a cylindrical aperture with a thrust ring depending radially inwardly therefrom such that the cylindrical aperture defines a first outer raceway and a second outer raceway on opposite sides of the thrust ring, the thrust ring including an outer circumferential surface and a pair of parallel sides depending radially inwardly therefrom that define opposed first and second bearing surfaces, the thrust ring being received in an annular groove that extends radially outwardly from an inner surface of the cylindrical aperture;
a crankshaft defining a cylindrical inner raceway disposed between a pair of opposed inner walls;
a first plurality of radial roller elements disposed between the first outer raceway and the inner raceway, each of the first radial roller elements having a first end face, an opposed second end face and defining an axial length therebetween; and
a second plurality of radial roller elements disposed between the second outer raceway and the inner raceway, each of the second radial roller elements having a first end face, an opposed second end face and defining an axial length therebetween,
wherein the axial length of at least one of the first plurality of radial roller elements is greater than an axial length of the first outer raceway and the axial length of at least one of the second plurality of radial roller elements is greater than an axial length of the second outer raceway,
the first end face of the at least one of the first plurality of radial roller elements contacts the first bearing surface of the thrust ring and its second end face extends axially outwardly beyond the first outer raceway, and
the first and second outer raceways are continuous along their lengths.

2. The bearing assembly of claim 1, wherein the first end face of the at least one of the second plurality of radial roller elements contacts the second bearing surface of the thrust ring and its second end face extends axially outwardly beyond the second outer raceway.

3. The bearing assembly of claim 2, wherein the second end face of each radial roller element of the first plurality extends axially outwardly beyond the first outer raceway when its first end face contacts the thrust ring.

4. The bearing assembly of claim 3, wherein the second end face of each radial roller element of the second plurality extends axially outwardly beyond the second outer raceway when its first end face contacts the thrust ring.

5. The bearing assembly of claim 1, wherein each of the first plurality and the second plurality of radial roller elements further comprises a full complement of radial roller elements.

6. The bearing assembly of claim 1, wherein a maximum axial length of the second end of the connecting rod is less than an overall axial length defined by the axial length of the at least one of the first plurality of radial roller elements, the axial length of the at least one of the second plurality of radial roller elements and an axial length of the thrust ring.

7. The bearing assembly of claim 1, wherein the inner raceway further comprises a first inner raceway and a second inner raceway, and the crankshaft includes a lubrication path with a first end and a second end, the second end being disposed between the first and second inner raceways.

8. The bearing assembly of claim 1, wherein the first end face of the at least one of the first plurality of radial roller elements contacts the thrust ring and its second end face contacts one of the pair of opposed inner walls of the crankshaft.

9. The bearing assembly of claim 8, wherein the first end face of the at least one of the second plurality of radial roller elements contacts the thrust ring and its second end face contacts another of the pair of opposed inner walls of the crankshaft.

10. A bearing assembly for use between a connecting rod defining an outer raceway and a crankshaft defining an inner raceway, comprising:
a first plurality of radial roller elements disposed between the outer raceway and the inner raceway, each of the first radial roller elements having a first end face, an opposed second end face and defining an axial length therebetween;
a second plurality of radial roller elements disposed between the outer raceway and the inner raceway, each of the second radial roller elements having a first end face, an opposed second end face and defining an axial length therebetween; and
a thrust ring including an outer circumferential surface and a pair of parallel sides depending radially inwardly therefrom that define opposed bearing surfaces, the thrust ring being both disposed between the first plurality of radial roller elements and the second plurality of radial roller elements and received in an annular groove that extends radially outwardly from the outer raceway of the connecting rod,
wherein a maximum axial length of the outer raceway of the connecting rod is less than an overall axial length defined by the axial length of the at least one of the first plurality of radial roller elements, the axial length of the at least one of the second plurality of radial roller elements and an axial length of the thrust ring,
and the first end faces of the first and second pluralities of radial roller elements contact a corresponding bearing surface of the thrust ring.

11. The bearing assembly of claim 10, wherein the outer raceway of the connecting rod further comprises a first outer raceway and a second outer raceway disposed on opposite sides of the thrust ring, and an axial length of at least one of the first plurality of radial roller elements is greater than an axial length of the corresponding first outer raceway and the axial length of at least one of the second plurality of radial roller elements is greater than an axial length of the corresponding second outer raceway.

12. The bearing assembly of claim 11, wherein the second end face of the at least one of the first plurality of radial roller elements extends axially outwardly beyond the first outer raceway.

13. The bearing assembly of claim 12, wherein the second end face of the at least one of the second plurality of radial roller elements extends axially outwardly beyond the second outer raceway.

14. The bearing assembly of claim 13, wherein the second end face of each radial roller element of the first plurality extends axially outwardly beyond the first outer raceway when its first end face contacts the thrust ring, and the second end face of each radial roller element of the second plurality extends axially outwardly beyond the second outer raceway when its first end face contacts the thrust ring.

15. The bearing assembly of claim 10, wherein each of the first plurality and the second plurality of radial roller elements further comprises a full complement of radial roller elements.

16. The bearing assembly of claim 10, wherein the inner raceway of the crankshaft further comprises a first inner raceway and a second inner raceway, and the crankshaft includes a lubrication path with a first end and a second end, the second end being disposed between the first and second inner raceways.

* * * * *